United States Patent
Hermann

(10) Patent No.: US 9,890,863 B2
(45) Date of Patent: Feb. 13, 2018

(54) PISTON SLIDE VALVE

(71) Applicant: Voith GmbH, Heidenheim (DE)

(72) Inventor: Jakob Hermann, Dettenhausen (DE)

(73) Assignee: Voith GmbH, Heidenheim (DE)

( * ) Notice: Subject to any disclaimer, the term of this patent is extended or adjusted under 35 U.S.C. 154(b) by 0 days.

(21) Appl. No.: 14/808,521

(22) Filed: Jul. 24, 2015

(65) Prior Publication Data

US 2016/0025229 A1 Jan. 28, 2016

Related U.S. Application Data

(63) Continuation of application No. PCT/EP2014/050560, filed on Jan. 14, 2014.

(30) Foreign Application Priority Data

Jan. 24, 2013 (DE) .................. 10 2013 001 148

(51) Int. Cl.
*F16K 3/24* (2006.01)
*F16K 31/528* (2006.01)
(Continued)

(52) U.S. Cl.
CPC ........... *F16K 3/0254* (2013.01); *F16H 21/18* (2013.01); *F16K 3/0218* (2013.01); *F16K 31/04* (2013.01); *F16K 31/52483* (2013.01)

(58) Field of Classification Search
CPC ............... F16K 31/043; F16K 31/047; F16K 31/52475; F16K 31/52483; F16K 31/523; F16L 3/314
(Continued)

(56) References Cited

U.S. PATENT DOCUMENTS 2,166,111 A * 7/1939 Bancroft ............... F04B 7/0046
 417/510
2,217,299 A * 10/1940 Taylor ..................... B60C 23/00
 137/637
(Continued)

FOREIGN PATENT DOCUMENTS

DE 25 09 523 A1 9/1976
WO 01/96749 A2 12/2001
WO 2009/097703 A1 8/2009

OTHER PUBLICATIONS

Jaeco Fluid Systems, "Hi-Flo Plunger pumps", published Sep. 2007 and archived by the Internet Archive Oct. 2011, retrived Sep. 2, 2016 from https://web.archive.org/web/20111011110311/http://jaecofs.com/pdf/Jaeco_Hi-Flo.pdf.*

*Primary Examiner* — Marina Tietjen
*Assistant Examiner* — Seth W MacKay-Smith
(74) *Attorney, Agent, or Firm* — Taylor IP, P.C.

(57) ABSTRACT

A piston slide valve including a valve housing, a piston slide mounted movably in the valve housing, which is reciprocally movable in the valve housing and configured to manipulate a fluid flow, and a valve drive. The valve drive includes a rotatable drive shaft, which is mechanically connected to the piston slide via a mechanical coupling. The mechanical coupling includes an actuating element which is eccentrically mounted on the rotatable drive shaft and which engages with a coupling piece that is attached to a radial outside of the piston slide, wherein either the actuating element has a spherical outer surface, which engages into said cylindrical opening of said coupling piece, or the coupling piece has an outer surface, which engages into a cylindrical opening of the actuating element.

20 Claims, 2 Drawing Sheets

(51) Int. Cl.
  *F16K 3/314*     (2006.01)
  *F16K 3/02*      (2006.01)
  *F16K 31/524*    (2006.01)
  *F16H 21/18*     (2006.01)
  *F16K 31/04*     (2006.01)

(58) Field of Classification Search
  USPC ................................. 251/129.2, 129.11, 251
  See application file for complete search history.

(56) References Cited

U.S. PATENT DOCUMENTS

| | | | | |
|---|---|---|---|---|
| 2,553,162 A | * | 5/1951 | Bancroft | F04B 1/02 417/461 |
| 3,453,968 A | | 7/1969 | Wortley | |
| 3,550,631 A | * | 12/1970 | Vanderlaan | F15B 13/04 137/625.65 |
| 4,026,196 A | * | 5/1977 | Olofsson | F04B 1/02 417/534 |
| 4,410,428 A | * | 10/1983 | Cooper | B01D 35/12 137/601.02 |
| 4,436,163 A | * | 3/1984 | Simpson | A01G 3/053 173/109 |
| 5,078,018 A | * | 1/1992 | Saita | B62D 7/1545 180/445 |
| 5,263,681 A | * | 11/1993 | Laux | F15B 13/0402 137/625.65 |
| 5,508,575 A | | 4/1996 | Elrod, Jr. | |
| 5,598,636 A | * | 2/1997 | Stolzer | B23D 49/165 30/393 |
| 5,601,421 A | | 2/1997 | Lee | |
| 6,000,678 A | * | 12/1999 | Coakley | F15B 13/0444 137/625.65 |
| 6,334,604 B1 | * | 1/2002 | Roth | F15B 13/0444 137/331 |
| 7,351,179 B2 | * | 4/2008 | Spickard | H02K 7/06 137/330 |
| 2007/0069592 A1 | | 3/2007 | Spickard | |
| 2012/0112109 A1 | * | 5/2012 | Lauffer | F16K 31/047 251/213 |

* cited by examiner

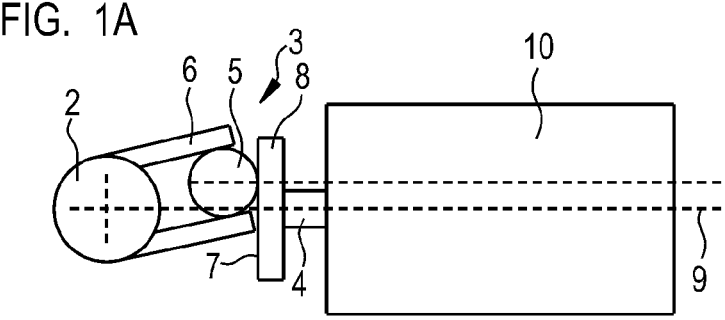 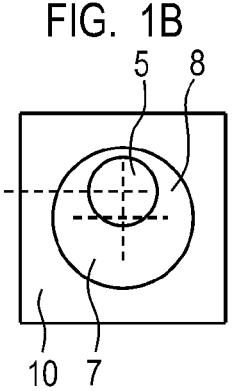
FIG. 1A  FIG. 1B
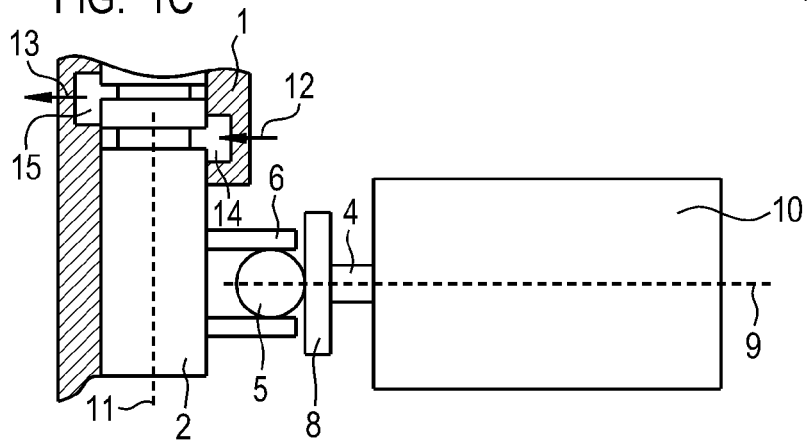
FIG. 1C
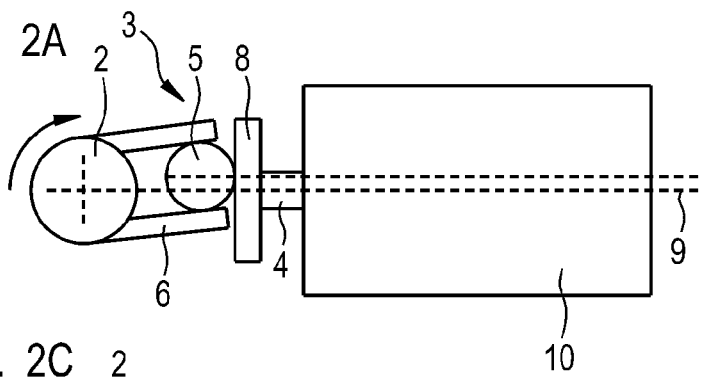 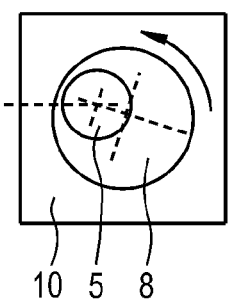
FIG. 2A  FIG. 2B
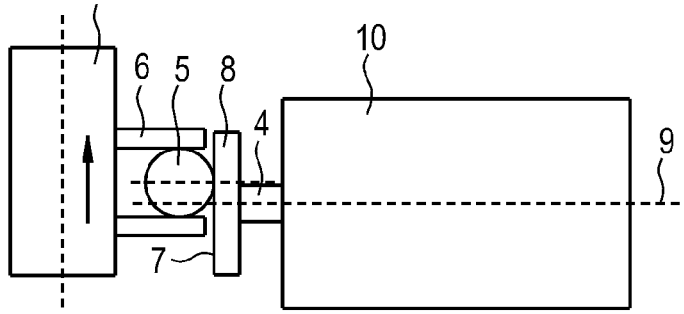
FIG. 2C

PISTON SLIDE VALVE

CROSS REFERENCE TO RELATED APPLICATIONS

This is a continuation of PCT application No. PCT/EP2014/050560, entitled "PISTON SLIDE VALVE", filed Jan. 14, 2014, which is incorporated herein by reference.

BACKGROUND OF THE INVENTION

1. Field of the Invention

The present invention relates to piston slide valves, and, more particularly, to a directly controlled servo valve.

2. Description of the Related Art

Piston slide valves are used in hydraulic systems as switching valves and proportional servo valves. The piston slide of the piston slide valve is being moved in a valve housing in such a manner—as a rule within a bore inside the valve housing—that flow cross sections for a fluid in the valve are more or less opened or closed, depending on the position of the piston slide relative to the valve housing in order to adjust hereby various switching positions having various flows through the valve from a pressure source to a pressure sink or respectively to a user, whereby the pressure source, the pressure sink and/or the user or several users are connected to appropriate fluid connections of the piston slide valve.

A distinction is made between pilot operated and direct controlled valves. With pilot operated valves the piston slide that is also referred to as the valve piston is moved hydraulically, whereby in order to produce the pilot forces, hydraulic valves are again used, which then as a rule must work clearly smaller and faster than the pilot operated valve—the so-called main stage. In contrast, with directly controlled valves an actuator acts mechanically or magnetically directly upon the piston slide (main piston), in order to switch the same between the various switching positions. Directly controlled valves are simpler in construction, however they are also limited in their size and positioning speed of the piston slide due to the control force that is to be applied.

One embodiment of direct controlled valves provides that the rotational movement of a motor that functions as an actuator, in particular a dynamic stepping or servo motor is converted into the desired linear movement of the piston slide. One problem with such valves is the high production cost for very precise fits of the components for the drive, in order to convert the rotational movement into the linear movement. This leads to high production costs and to the risk of jams during operation.

WO 2009/097703 A1 describes a proportional valve, wherein the drive shaft of an electric motor moves the piston slide reciprocally via a cam that engages into a recess of a yoke that is attached to the piston slide. The pivot point of the cam in the recess of the yoke is positioned on the longitudinal axis of the piston slide, inside a notch in the yoke that progresses parallel to the rotational axis of the electric motor.

U.S. Pat. No. 5,263,681 A describes a coupling between the drive shaft of an electric motor and the piston slide of a hydraulic valve which is split and designed elastically resilient and pre-tensioned against spring forces.

Patent Application US 2007/0069592 A1 describes the transfer of a rotational movement of a stepper motor via a planetary gear onto a cam that is positioned in an opening of a piston slide.

DE 25 09 523 A1 describes a switch head to operate a piston slide of a directional control valve in longitudinal direction, wherein a spherical surface engages into the cylindrical bore of a control slide and interacts with a flat surface in order to permit the piston slide to engage in certain switching positions.

U.S. Pat. No. 5,508,575 A describes an eccentric cone that is positioned on a motor drive shaft that engages in an insert that is positioned in a bore in the piston slide in order to move the piston slide by means of driving the electric motor.

WO 01/96749 A2 describes a ball eccentrically mounted on the drive shaft of an electric motor that engages into a bore, a slot or a notch of the piston slide in order to move it reciprocally.

The aforementioned arrangements have the disadvantage that between the actuating element that is mounted eccentrically on the motor drive shaft and that engages into diversely designed openings in the piston slide shaft, unfavorable surface pressures arise that vary with the displacement of the piston slide and which, on the one hand require highly precise fits during production and on the other hand favor excessive wear and tear, and jamming of the actuating element in the piston slide.

What is needed in the art is an improved piston slide valve of the aforementioned type in such a way that the valve can be produced cost effectively and simply and that the mechanism between the valve drive and the piston slide operates reliably and with little wear and tear.

SUMMARY OF THE INVENTION

The present invention provides a piston slide valve that has a valve drive engaging with a coupling piece positioned on the piston slide.

The inventive piston slide valve includes a valve housing and a piston slide movably mounted in the valve housing. The piston slide which is mounted for example inside a bore in the valve housing on which various connections for fluid, for example hydraulic fluid, are provided. The piston slide is reciprocally movable in the valve housing for control or adjustment of the fluid flow.

The piston slide valve further includes a valve drive comprising a rotatable drive shaft which is connected via a mechanical coupling with the piston slide to the drive thereof. The mechanical coupling converts a rotational movement into a linear movement of the piston slide.

According to the invention the mechanical coupling has an actuating element which is eccentrically mounted on the drive shaft and which engages with a coupling piece that is attached to the radial outside of the piston slide, whereby either the actuating element has a spherical outer surface which engages into a cylindrical opening of the coupling piece, or the coupling piece has a spherical outer surface which engages into a cylindrical opening of the actuating element.

A low wear and tear embodiment can be achieved if the contact zone between the actuating element and the coupling piece is lubricated. Contact zone is hereby understood to be the region of surfaces of the actuating element and the coupling piece facing one another where a contact between the surfaces can or does occur during operation of the piston slide valve. This contact zone is designed so that a hydrodynamic lubricating film is formed between the two frictional parties (actuating element and coupling piece) during their movements relative to each other. For example, a convergent—in other words narrowing lubrication gap may be provided.

Also a viscous fluid that adheres to the surfaces of the friction partners may be used. A clearance that is not too small may be provided between friction partners—in other words between the actuating element and coupling piece. The smallest distance between the actuating element and coupling piece that defines the clearance may for example be between 4 µm and 10 µm.

In designing the low wear and tear contact zone, the ratio of the diameter of the contact zone relative to the eccentricity—in other words the eccentric offset of the actuating element relative to the drive shaft—may be sufficiently large. The diameter of the cylindrical opening of the coupling piece or the actuating element may therefore be at least 3-times, at least 4-times or at least 4.5 times the eccentric offset of the actuating element relative to the drive shaft, whereby the eccentric offset can be defined by a distance between a rotational axis of the drive shaft and a center axis of the actuating element parallel thereto. Due to this comparatively large ratio a relatively high relative speed of the friction partners can be achieved when operating the piston slide valve that in turn contributes effectively to the formation of a hydrodynamic lubricating film.

One inventive embodiment provides that at least in the contact zone of the friction partners the surface of the actuating element is rougher than that of the coupling. The roughness can be described as average roughness $R_a$ or as average peak to valley height $R_z$, according to ISO 25178.

The component having the spherical outer surface, which may be the coupling piece, can be manufactured from a polished antifriction bearing ball, or in other words an antifriction bearing raw material.

According to one embodiment the space between the cylindrical opening in the actuating element or the coupling can be connected with the surrounding area by only the gap between the actuating element and the coupling. Alternatively, the cylindrical opening can be connected with the surrounding area via one or more bores in the actuating element or coupling piece.

In or on the component having the cylindrical opening that interacts with the spherical outer surface, conductive elements may be provided that deliver a lubricant in the direction toward the contact zone. It is moreover possible to intensify cooling of the lubricating film in the contact zone in that ribs may be provided on the component having the cylindrical opening, in order to increase the surface thereof.

If the actuating element has an outer cylindrical surface then said surface can serve to accommodate an antifriction bearing.

The coupling piece is designed in the form of a protrusion, protruding radially outward from the piston slide, produced as a single component with the piston slide, or mounted interlocking or firmly bonded on the same. Such a protrusion may for example be designed as a single non-continuous protrusion over the circumference in contrast to a protruding continuous collar. According to a first embodiment the cylindrical opening, which may be a cylindrical bore, is provided inside the protrusion. An alternative embodiment provides that the protrusion has the spherical surface and is designed for example as a ball, ball zone or ball segment.

In the first embodiment the protrusion may be designed as a cylindrical sleeve that is attached on the outside to the piston slide or is produced as a single component with the same. In the second embodiment the ball, the ball zone or the ball segment can for example be attached on the outside of the piston slide or can be produced as a single component with the same.

With both embodiments it is possible that the piston slide has at least a cylindrical segment or end segment having a flat surface on its cylindrical surface and that the protrusion is positioned on the flat surface.

According to another embodiment the drive shaft has a front face facing the piston slide on which the actuating element is eccentrically mounted or is integral with the same. The actuating element can be in the form for example of a cylinder, quadrant or polyhedron, having a rod-shaped form protruding from the front face; and can have the cylindrical opening on a first front face and have a drive opening on the second front face facing in opposite direction to the first front face, whereby the drive opening is positioned eccentrically offset from the cylindrical opening and whereby the drive shaft engages operatively into the drive opening, and is enclosed by the same, frictionally engaged or positively locking, in order to pivot the actuating element eccentrically via the rotational axis of the drive shaft.

In order to design a direct controlled servo valve, the drive shaft can at the same time be the drive shaft of an electric motor, in particular a servo or stepper motor. Of course, in-line connection of mechanical or other transmission elements is also possible between the drive motor, for example the electric motor and the drive shaft.

The actuating element and the coupling piece may be in linear contact relative to each other in all possible positions.

Due to the arrangement according to the invention the piston slide is moved linearly and at the same time in a rotary movement around its longitudinal axis during a rotational deflection of the drive shaft or respectively eccentric deflection of the actuating element. Due to the fact that the coupling piece is attached on the outside of the piston slide, a comparatively large lever is created for initiation of the rotary movement of the piston slide, preventing a jam. Thus the point of application of force of the torsional force acting in tangential direction of the piston slide is located outside the outer diameter of the piston and is thereby far removed from the rotational axis and longitudinal axis of the piston slide.

By extending and shortening the radial extension of the coupling piece the lever that is effective for the rotation of the piston slide can be easily and cost effectively changed and freely selected.

As clearance between the actuating element and the coupling piece a clearance of for example 10 µm or less is considered.

The mechanical coupling between the drive shaft and the piston slide can be produced cost effectively and with easy adherence to the required tolerances. At the same time, low pressure and thus low wear and tear occur between the actuating element and coupling piece.

BRIEF DESCRIPTION OF THE DRAWINGS

The above-mentioned and other features and advantages of this invention, and the manner of attaining them, will become more apparent and the invention will be better understood by reference to the following descriptions of the embodiments of the invention taken in conjunction with the accompanying drawings, wherein:

FIGS. 1A-1C illustrate a first embodiment of a piston slide valve according to the invention in its starting position;

FIGS. 2A-2C are a schematic illustration of an the piston slide valve of FIGS. 1A-1C in an end position.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 3:
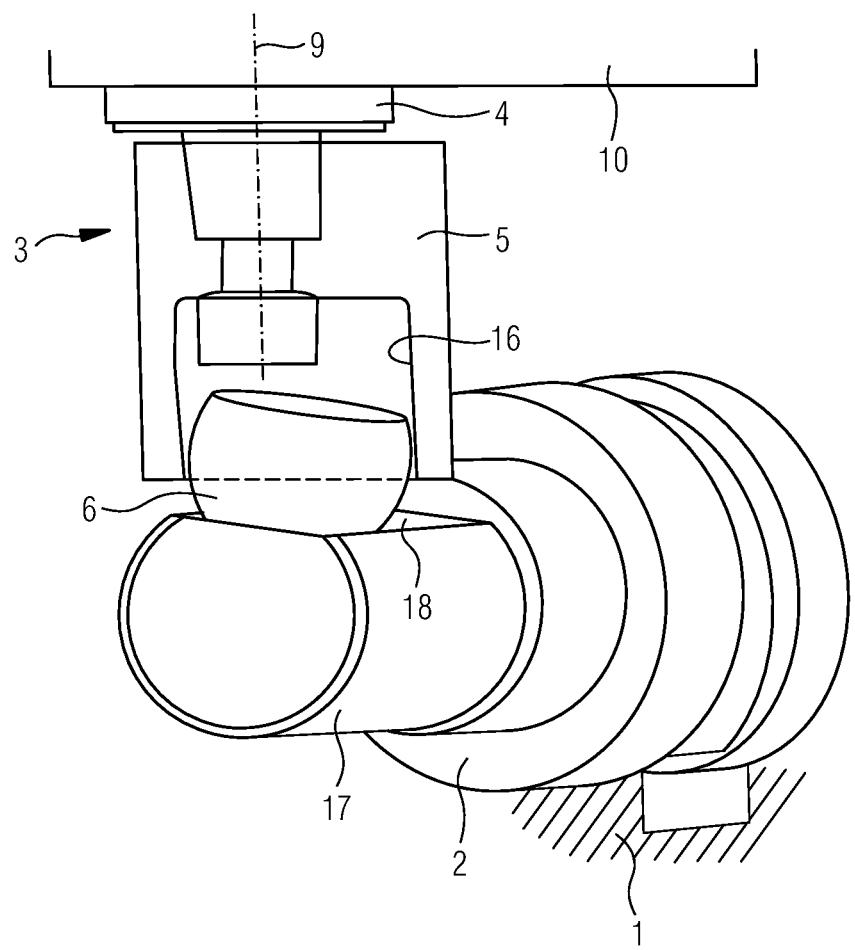
FIG. 3 is an illustration of an alternative arrangement of a piston slide valve according to the invention.

Referring now to the drawings, and more particularly, to FIGS. 1A, 1B and 1C, there is shown a schematic depiction of a piston slide valve according to the invention. FIG. 1A illustrates a side view of electric motor 10 and the face side of the piston slide 2. FIG. 1B shows the face side of the drive shaft of electric motor 10. FIG. 1C shows a second side of electric motor 10 and the cylindrical surface of piston slide 2. The drive shaft of electric motor 10 embodies drive shaft 4 of the piston slide valve. Drive shaft 4 has a support 8 on its free end, in this example in the shape of a plate that supports actuating element 5, in this example in the embodiment of a ball, eccentrically to rotational axis 9 of electric motor 10. Actuating element 5 is thus attached on face side 7 of drive shaft 4, or respectively of the herein provided support 8 that is facing toward piston slide 2.

Actuating element 5 engages in a coupling piece 6 in the embodiment of a hollow cylinder that is attached radially to outside of piston slide 2.

By driving drive shaft 4, actuating element 5—due to the fact that it is surrounded by coupling piece 6—moves coupling piece 6 in the direction of longitudinal axis 11 of piston slide 2, whereby coupling piece 6 is at the same time pivoted over longitudinal axis 11 of piston slide 2. Thus, piston slide 2 is moved linearly and at the same time pivoted over its longitudinal axis 11.

FIGS. 2A-2C, which are in their illustrations consistent with FIGS. 1A-1C, show the moved and pivoted position of piston slide 2 in contrast to the starting position in FIG. 1.

Piston slide 2 is movably mounted in a valve housing 1. By rotating drive shaft 4 back and forth piston slide 2 is moved reciprocally in valve housing 1. Such a reciprocal movement can also be achieved by rotationally driving drive shaft 4 in only one direction.

Valve housing 1 has at least one pressure connection 12 for a fluid that is to be controlled or adjusted as well as one load connection or tank connection (pressure sink connection) 13. The connections discharge in pressure chambers 14, 15 that are provided in the piston slide valve. The flow cross section between pressure chambers 14 and 15 is either opened or as indicated in FIG. 1c closed in the starting position by means of the aforementioned movement of piston slide 2. Piston slide 2 has metering edges for this purpose which interact with valve housing 1.

In the embodiment according to FIG. 3 drive shaft 4—in this example also in the embodiment of a drive shaft of an electric motor 10—supports an actuating element 5 in the form of a rod-shaped body. In the illustrated design example—but not absolutely required—actuating element 5 is in the embodiment of a cylinder that interacts with coupling piece 6 in the embodiment of a ball zone.

Cylinder shaped actuating element 5 has a cylindrical opening 16 on its first front face—namely the front face facing piston slide 2—in which opening coupling piece 6 engages with its spherical surface over the entire circumference. Drive shaft 4 of valve drive 3 engages in the second opposite face side, frictionally and/or positively locking.

Through turning drive shaft 4 of valve drive 3, cylindrical actuating element 4 is eccentrically pivoted over rotational axis 9 of drive shaft 4.

In the illustrated design example piston slide 2 has a cylindrical notch 17 with a flat surface 18 on the diameter. Coupling piece 6 is positioned on flat surface 18.

The arrangement according to FIG. 3 with coupling piece 6 with spherical outer surface on piston slide 2 and cylindrical or spherical opening in actuating element 5 on drive shaft 4 could obviously also be designed, deviating from the herein illustrated details.

The current invention relates to direct controlled valves, however it can also be used for pilot-controlled valves.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A piston slide valve for manipulating a fluid flow, comprising:
a valve housing;
a piston slide mounted movably in said valve housing and defining a longitudinal axis, said piston slide is reciprocally movable in said valve housing and configured to manipulate said fluid flow, said piston slide having a radial outside and a diameter, and including:
a coupling piece that is fixedly attached to the radial outside of the piston slide such that the coupling piece is fixed relative to the piston slide, said coupling piece defining a center axis that is perpendicular to said longitudinal axis of said piston slide and having a cylindrical opening which is coaxial with said center axis, said coupling piece is designed in the form of a cylindrical protrusion having an outer diameter that is one of equal to and less than said diameter of the piston slide, said cylindrical protrusion protruding perpendicularly from said longitudinal axis of said piston slide and protruding radially outward along said center axis from the radial outside of said piston slide; and
a valve drive, including:
a rotatable drive shaft; and
a mechanical coupling, wherein said rotatable drive shaft is connected via said mechanical coupling with said piston slide, said mechanical coupling including:
an actuating element which is eccentrically mounted on said rotatable valve shaft and which engages with said coupling piece that is attached to the radial outside of the piston slide, wherein said actuating element has a spherical outer surface which engages into said cylindrical opening of said coupling piece.

2. The piston slide valve according to claim 1, wherein a diameter of said cylindrical opening of the coupling piece is at least 3 to 4.5-times an eccentric offset of said actuating element relative to said rotatable drive shaft, whereby the eccentric offset is defined by a distance between a rotational axis of said rotatable drive shaft and a center axis of said actuating element parallel thereto.

3. The piston slide valve according to claim 1, wherein a surface of said actuating element that is facing said coupling piece is rougher than a surface of the coupling piece, at least in a region defining a contact zone between the actuating element and coupling piece.

4. The piston slide valve according to claim 1, wherein a clearance between said actuating element and said coupling piece is between 4 µm and 10 µm.

5. The piston slide valve according claim 1, wherein said cylindrical opening is a cylindrical bore inside the protrusion.

6. The piston slide valve according claim 5, wherein said protrusion is designed as a cylindrical sleeve.

7. The piston slide valve according claim 5, wherein said piston slide has at least one of an end segment with a cylindrical surface and having a flat surface on its cylindrical surface, and said protrusion is positioned on the flat surface.

8. The piston slide valve according claim 1, wherein said rotatable drive shaft has a front face facing said piston slide on which said actuating element is at least one of eccentrically mounted and eccentrically integral with said front face.

9. The piston slide valve according to claim 1, wherein said rotatable drive shaft is a drive shaft of an electric motor.

10. The piston slide valve according to claim 1, wherein said actuating element and said coupling piece are in linear physical contact relative to each other.

11. A piston slide valve for manipulating a fluid flow, comprising:
a valve housing;
a piston slide mounted movably in said valve housing, said piston slide is reciprocally movable in said valve housing and configured to manipulate said fluid flow, said piston slide having a radial outside and a distal end and including:
a coupling piece that is attached to said radial outside of the piston slide and located at said distal end, said coupling piece is designed in the form of a protrusion, protruding radially outward from said radial outside of the piston slide; and
a valve drive, including:
a rotatable drive shaft; and
a mechanical coupling, wherein said rotatable drive shaft is connected via said mechanical coupling with said piston slide, said mechanical coupling including:
an actuating element having a cylindrical opening, said actuating element is eccentrically mounted on said rotatable drive shaft and which engages with said coupling piece that is attached to the radial outside of the piston slide, wherein the coupling piece has an outer surface which engages into said cylindrical opening of said actuating element.

12. The piston slide valve according to claim 11, wherein a diameter of said cylindrical opening of the actuating element is at least 3 times an eccentric offset of said actuating element relative to said rotatable drive shaft, whereby the eccentric offset is defined by a distance between a rotational axis of said rotatable drive shaft and a center axis of said actuating element parallel thereto.

13. The piston slide valve according to claim 11, wherein a surface of said actuating element that is facing said coupling piece is rougher than a surface of the coupling piece, at least in a region defining a contact zone between the actuating element and coupling piece.

14. The piston slide valve according to claim 11, wherein a clearance between said actuating element and said coupling piece is between 4 µm and 10 µm.

15. The piston slide valve according to claim 11, wherein said coupling piece has a spherical outer surface.

16. The piston slide valve according to claim 15, wherein said protrusion is designed as at least one of a ball, a ball zone and a ball segment.

17. The piston slide valve according to claim 15, wherein said piston slide has at least one of an end segment with a cylindrical surface and having a flat surface on its cylindrical surface, and said protrusion is positioned on the flat surface.

18. The piston slide valve according to claim 11, wherein said rotatable drive shaft has a front face facing said piston slide on which said actuating element is at least one of eccentrically mounted and eccentrically integral with said front face.

19. The piston slide valve according to claim 11, wherein said actuating element is designed as at least one of a cylinder, polyhedron and quadrant, having a cylindrical opening on a first front face and having a drive opening on a second front face facing in an opposite direction to said first front face, wherein said drive opening is positioned eccentrically offset from said cylindrical opening such that said drive shaft engages operatively into the drive opening in order to pivot said actuating element eccentrically via a rotational axis of the drive shaft.

20. The piston slide valve according to claim 11, wherein said rotatable drive shaft is a drive shaft of an electric motor.

* * * * *